(12) United States Patent  
Miura et al.

(10) Patent No.: US 8,712,677 B2  
(45) Date of Patent: Apr. 29, 2014

(54) NAVIGATION DEVICE, NAVIGATION METHOD, AND NAVIGATION PROGRAM

(75) Inventors: Naoki Miura, Toyokawa (JP); Junichi Nonomura, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 810 days.

(21) Appl. No.: 12/858,871

(22) Filed: Aug. 18, 2010

(65) Prior Publication Data

US 2011/0060493 A1 Mar. 10, 2011

(30) Foreign Application Priority Data

Sep. 4, 2009 (JP) ................................. 2009-205224

(51) Int. Cl.
*G06F 19/00* (2011.01)
*G01C 21/30* (2006.01)

(52) U.S. Cl.
USPC .......... 701/123; 701/410; 701/423; 701/32.5; 701/96; 701/31.4; 180/65.26; 340/436; 340/988; 340/989

(58) Field of Classification Search
USPC ........... 701/29, 123, 209, 408–410, 416, 428, 701/465
See application file for complete search history.

(56) References Cited

U.S. PATENT DOCUMENTS

| | | | |
|---|---|---|---|
| 5,627,752 A * | 5/1997 | Buck et al. ...................... | 701/36 |
| 6,005,494 A * | 12/1999 | Schramm ................. | 340/995.19 |
| 6,026,346 A * | 2/2000 | Ohashi et al. ................. | 701/416 |
| 6,249,723 B1 * | 6/2001 | Lutz ................................. | 701/22 |
| 6,594,576 B2 * | 7/2003 | Fan et al. ..................... | 701/117 |
| 7,344,687 B2 * | 3/2008 | Oi et al. ........................ | 422/198 |
| 7,369,938 B2 * | 5/2008 | Scholl ............................ | 701/428 |
| 7,849,944 B2 * | 12/2010 | DeVault ..................... | 180/65.29 |
| 7,877,198 B2 * | 1/2011 | Tenzer et al. .................. | 701/123 |
| 8,121,779 B2 * | 2/2012 | Kon et al. ..................... | 701/465 |
| 8,185,302 B2 * | 5/2012 | Schunder ...................... | 701/408 |
| 8,290,695 B2 * | 10/2012 | Hiestermann et al. ........ | 701/119 |

(Continued)

FOREIGN PATENT DOCUMENTS

| | | |
|---|---|---|
| JP | B-05-088475 | 12/1993 |
| JP | A-7-077058 | 3/1995 |

(Continued)

OTHER PUBLICATIONS

Feb. 14, 2011 European Search Report issued in EP 10 17 3272.

(Continued)

*Primary Examiner* — Thomas Black
*Assistant Examiner* — Wae Louie
(74) *Attorney, Agent, or Firm* — Oliff PLC

(57) ABSTRACT

Navigation devices, methods, and programs acquire a reference position related to the traveling of a host vehicle and acquire a host vehicle condition at the reference position. The devices, methods, and programs accesses a travel information storage unit that stores travel sequences. The stored data for each travel sequences includes at least one position along the travel sequence, operation information that specifies a vehicle operation at each stored position, and vehicle condition information that specifies a vehicle condition at each stored position. The devices, methods, and programs identify a stored sequence of travel having a stored position that corresponds to the acquired host vehicle reference position and stored vehicle condition information that corresponds to the acquired host vehicle condition, acquire the stored operation information of the identified stored sequence of travel, generate display information based on the acquired operation information, and display the generated display information.

18 Claims, 7 Drawing Sheets

(56) References Cited

U.S. PATENT DOCUMENTS

| | | | |
|---|---|---|---|
| 8,374,740 B2* | 2/2013 | Druenert et al. | 701/22 |
| 8,392,110 B2* | 3/2013 | Schunder | 701/409 |
| 2005/0055157 A1* | 3/2005 | Scholl | 701/207 |
| 2008/0319596 A1* | 12/2008 | Yamada | 701/22 |
| 2009/0114463 A1* | 5/2009 | DeVault | 180/65.29 |
| 2011/0060493 A1* | 3/2011 | Miura et al. | 701/29 |
| 2011/0264317 A1* | 10/2011 | Druenert et al. | 701/22 |
| 2012/0083960 A1* | 4/2012 | Zhu et al. | 701/23 |

FOREIGN PATENT DOCUMENTS

| | | |
|---|---|---|
| JP | A-07-159194 | 6/1995 |
| JP | A-2000-333305 | 11/2000 |
| JP | A-2004-108777 | 4/2004 |
| JP | A-2006-160191 | 6/2006 |
| JP | A-2007-050888 | 3/2007 |
| JP | A-2008-238972 | 10/2008 |
| JP | A-2009-063555 | 3/2009 |

OTHER PUBLICATIONS

Japanese Patent Office, Notification of Reason(s) for Refusal mailed Apr. 11, 2013 in Japanese Patent Application No. 2009-205224 w/Partial English-language Translation.

* cited by examiner

FIG.2

[TRAVEL INFORMATION DB]

| TRAVEL ID | POSITION | OPERATION | SOC(%) | FUEL CONSUMPTION (L) |
|---|---|---|---|---|
| 001 | 36.5520 , 135.3654 | EV | 70 | 0 |
| | 36.5525 , 135.3656 | EV | 66 | 0 |
| | 36.5531 , 135.3655 | EV | 59 | 0 |
| | 36.5536 , 135.3653 | HV | 60 | 0.02 |
| | 36.5542 , 135.3652 | HV | 62 | 0.04 |
| | ⋮ | ⋮ | ⋮ | ⋮ |
| 002 | 36.5520 , 135.3654 | HV | 45 | 0 |
| | 36.5525 , 135.3656 | HV | 46 | 0.02 |
| | 36.5531 , 135.3655 | HV | 46 | 0.03 |
| | 36.5536 , 135.3653 | HV | 47 | 0.04 |
| | 36.5542 , 135.3652 | HV | 46 | 0.06 |
| | ⋮ | ⋮ | ⋮ | ⋮ |
| ⋮ | ⋮ | ⋮ | ⋮ | ⋮ |

NAVIGATION DEVICE, NAVIGATION METHOD, AND NAVIGATION PROGRAM

INCORPORATION BY REFERENCE

The disclosure of Japanese Patent Application No. 2009-205224, filed on Sep. 4, 2009, including the specification, drawings, and abstract is incorporated herein by reference in its entirety.

BACKGROUND

1. Related Technical Fields

Related technical fields include navigation devices, navigation methods, and navigation programs.

2. Related Art

A travel display device has been proposed in the past for presenting a user with an efficient travel route capable of reducing fuel consumption when route guidance is performed in a hybrid vehicle having an internal combustion engine and a motor generator (see Japanese Patent Application Publication No. JP-A-2009-63555, paragraphs 0013 and 0016, for example). A vehicle travel history is collected and stored in this device. Based on past travel histories from departure points to destination points, every travel route having a travel history is evaluated based on fuel economy. A travel route that achieved the best evaluation among such evaluations is then displayed along with a travel pattern for the travel route.

SUMMARY

Vehicle conditions such as the battery state of charge and number of occupants and environmental conditions such as the temperature and weather are not always the same at the time of departure. However, in the conventional device as described above, a travel route resulting from an unfeasible travel pattern in practice may be displayed because such differences in vehicle conditions at the time of departure are not considered. For example, a travel pattern displayed in the conventional device may be a travel pattern that assumes a fully charged battery state at the time of departure. However, if the battery is not sufficiently charged at the start of actual travel, it may not be possible to fully follow the travel pattern displayed by the conventional device.

Exemplary implementations of the broad inventive principles described herein provide a navigation device, a navigation method, and a navigation program, which provide guidance that considers a vehicle condition at the time of departure.

Exemplary implementations provide navigation devices, methods, and programs that acquire a reference position related to the traveling of a host vehicle and acquire a host vehicle condition at the reference position. The devices, methods, and programs accesses a travel information storage unit that stores travel sequences. The stored data for each travel sequences includes at least one position along the travel sequence, operation information that specifies a vehicle operation at each stored position, and vehicle condition information that specifies a vehicle condition at each stored position. The devices, methods, and programs identify a stored sequence of travel having a stored position that corresponds to the acquired host vehicle reference position and stored vehicle condition information that corresponds to the acquired host vehicle condition, acquire the stored operation information of the identified stored sequence of travel, generate display information based on the acquired operation information, and display the generated display information.

BRIEF DESCRIPTION OF THE DRAWINGS

FIG. 2 is a table that illustrates a travel information database;

DETAILED DESCRIPTION OF EXEMPLARY IMPLEMENTATIONS

Figure 1:
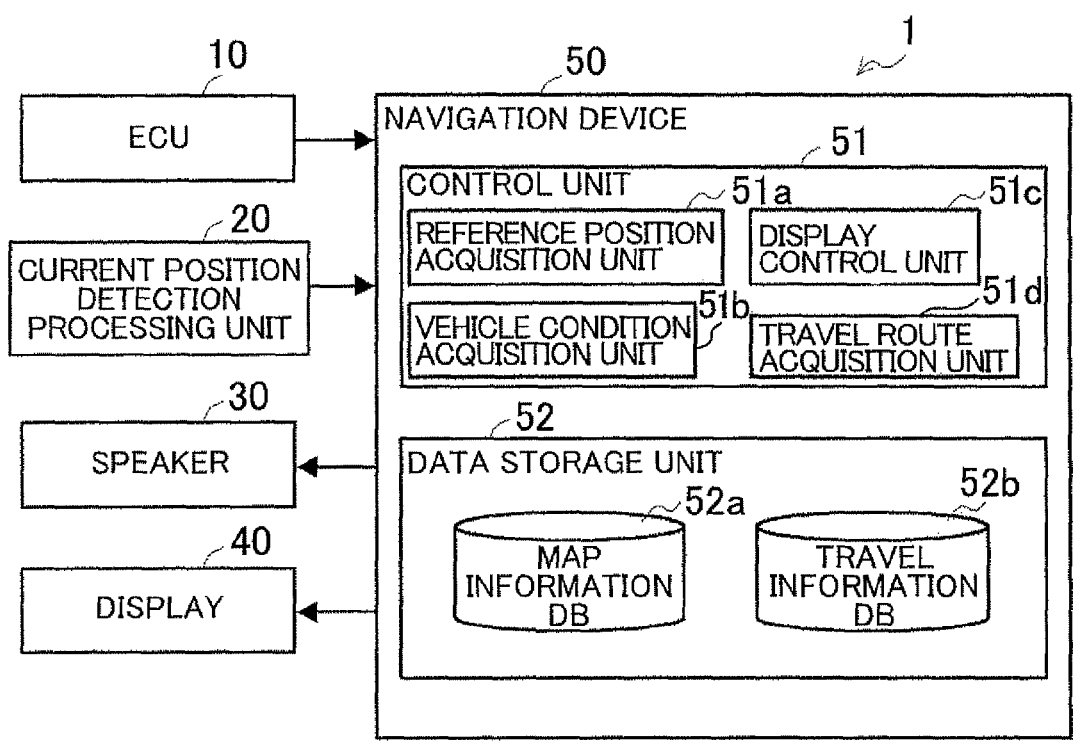
FIG. 1 is a block diagram that illustrates a navigation system according to an example.

Hereinafter, examples of a navigation device, a navigation method, and a navigation program will be described in detail with reference to the drawings. However, the scope of the inventive principles is not limited to such examples. Note that application of the navigation device, the navigation method, and the navigation program is not limited to any one form. However, in the examples below, the inventive principles are applied to a hybrid vehicle that runs using an engine and a motor generator (neither of which is shown in the drawings) as drive sources.

I. Constitution

The constitution of a navigation system will now be described. FIG. 1 is a block diagram that illustrates a navigation system for a host vehicle according to an example. As shown in FIG. 1, a navigation system 1 includes an electronic control unit (ECU) 10, a current position detection processing unit 20, a speaker 30, a display 40, and a navigation device 50.

A. ECU

The ECU 10 controls various parts of the vehicle, such as a power system including the engine and the motor generator, a transmission, a drive train, and a brake system. The ECU 10 also monitors the states of various parts of the vehicle through various types of sensors. For example, the ECU 10 monitors a state of charge (abbreviated to SOC below) of a battery (not shown in the drawing) and a remaining fuel amount. In the hybrid vehicle, the ECU 10 operates the engine to maintain the battery SOC to a prescribed state, and controls switching between the running modes of a hybrid driving mode (hereinafter referred to as an HV mode) in which the vehicle runs using the engine and the motor generator for power, and an electric motor driving mode (hereinafter referred to as an EV mode) in which the vehicle runs using only the motor generator for power.

B. Current Position Detection Processing Unit

The current position detection processing unit 20 detects the current position of a vehicle (also referred to as a host vehicle below) installed with the navigation device 50. Specifically, the current position detection processing unit 20 has at least one of a GPS, a geomagnetic sensor, a distance sensor, and a gyroscopic sensor (none of which are shown in the drawing), and detects the current position (coordinates), heading, and the like of the host vehicle using commonly known methods.

C. Speaker

The speaker 30 is an output unit that outputs various types of audio based on a control of the navigation device 50. The specific voice output from the speaker 30 may take on any form, and it is possible to output a synthetic voice that is generated as necessary or a pre-recorded voice.

D. Display

The display 40 is a display unit that displays various types of images based on a control of the navigation device 50. Note that the specific constitution of the display 40 may take on any form, and a flat panel display such as a commonly known liquid crystal display or organic EL display may be used.

E. Navigation Device

The navigation device 50 provides guidance related to vehicle travel, and includes a controller (e.g., control unit 51) and a data storage unit 52. The navigation device 50 includes a function for providing guidance regarding vehicle travel routes using a commonly known route guidance method.

1. Control Unit

The control unit 51 controls the navigation device 50. Specifically, the control unit 51 is a computer with a configuration that includes a CPU, various programs that are interpreted and executed in the CPU (including OS and other basic control programs, and application programs that are activated in the OS to carry out specific functions), and an internal memory such as a RAM and/or ROM for storing the programs and various data. In particular, the navigation program according to the present example is installed in the navigation device 50 through any storage medium or network, and configures various portions of the control unit 51 in substance.

The control unit 51 includes a reference position acquisition unit 51a, a vehicle condition acquisition unit 51b, a display control unit 51c, and a travel route acquisition unit 51d in terms of functional concept.

The reference position acquisition unit 51a acquires a reference position related to vehicle travel. The "reference position" includes, for example, a current vehicle position, a departure point on a travel route, or the like. The vehicle condition acquisition unit 51b acquires a vehicle condition of the vehicle at the reference position. The specific content of the "vehicle condition" may take on any form, and can include, for example, the battery SOC, the number of occupants, or the like. The display control unit 51c performs a display control of various information through the display 40. The processes that are executed by these functional elements of the control unit 51 will be described in detail later.

2. Data Storage Unit

The data storage unit 52 is a storage unit that stores programs and various data required for operation of the navigation device 50, and has a configuration that uses a hard disk (not shown in the drawing) as an external memory device, for example. However, any other storage mediums, including a magnetic storage medium such as a magnetic disk or an optical storage medium such as a DVD or Blu-ray disc, can be used in place of or in combination with the hard disk.

The data storage unit 52 has a map information database 52a and a travel information database 52b. (Note that database will be abbreviated to "DB" below.) The map information DB 52a is a map information storage unit that stores map information. The "map information" includes, for example, link data (link number, connection node number, road coordinates, road type, number of lanes, travel restrictions, and the like), node data (node number and coordinates), feature data (traffic signals, road signs, guard rails, buildings, and the like), topography data, and map display data for displaying a map on the display 40.

The travel information DB 52b is a travel information storage unit that stores information related to vehicle travel. FIG. 2 is a table that illustrates the travel information DB 52b. As shown in FIG. 2, the travel information DB 52b includes "Travel ID," "Position," "Operation," "SOC," and "Fuel consumption" as database items, and information that corresponds to these items is mutually associated and stored in the travel information DB 52b. Information stored as corresponding to the item "Travel ID" is identification information that uniquely identifies a sequence of travel of the vehicle ("001," "002" and so on in FIG. 2). Here, a "sequence of travel" of the vehicle is a unit that sections the vehicle travel history, and refers to travel from a departure point to a destination point based on a commonly known route guidance method, for example. Information stored as corresponding to the item "Position" is position information for specifying a position of the vehicle; for example, a vehicle latitude and longitude are stored ("36.5520, 135.3654" and so on in FIG. 2). Information stored as corresponding to the item "Operation" is operation information that specifies an operation of the vehicle at each position the vehicle traveled during the sequence of travel of the vehicle; for example, information that specifies the vehicle driving mode is stored ("EV," "HV" and so on in FIG. 2). Information stored as corresponding to the item "SOC" is vehicle condition information that specifies a vehicle condition of the vehicle at each position the vehicle traveled. For example, information that specifies the SOC of the battery is stored ("70," "66" and so on in FIG. 2). Information stored as corresponding to the item "Fuel consumption" is fuel consumption information that specifies the fuel consumption. For example, information that specifies the amount of fuel consumed from the start of vehicle travel until each position is reached is stored ("0," "0.02" and so on in FIG. 2). The timing at which the above information is stored in a behavior table may be any timing, and such information may be updated as needed in a travel information acquisition process that will be described later, for example. Note that with regard to the item "SOC," the vehicle condition information for at least one position among the positions traveled by the vehicle may be stored. For example, for the departure point alone, information that specifies the SOC of the vehicle at the departure point may be associated with the item "SOC" and stored. In the description below, the position information, the operation information, the vehicle condition information, and the fuel consumption information associated with and stored for each piece of identification information, which uniquely identifies a sequence of travel, will be called a "sequence of travel information."

II. Processing

Exemplary methods or processing will be explained below. The exemplary methods may be implemented, for example, by one or more components of the above-described navigation system 1. For example, the exemplary methods may be implemented by the control unit 51 executing a computer program stored in the a ROM, RAM, and/or the data storage unit 52. However, even though the exemplary structure of the above-described navigation system 1 may be referenced in the description, it should be appreciated that the structure is exemplary and the exemplary methods need not be limited by any of the above-described exemplary structure.

The exemplary methods are roughly divided into a travel information acquisition process that acquires information related to vehicle travel, and a display control process that performs a display control of operation information. The travel information acquisition process and the display control process will be explained below.

A. Travel Information Acquisition Process

Figure 3:
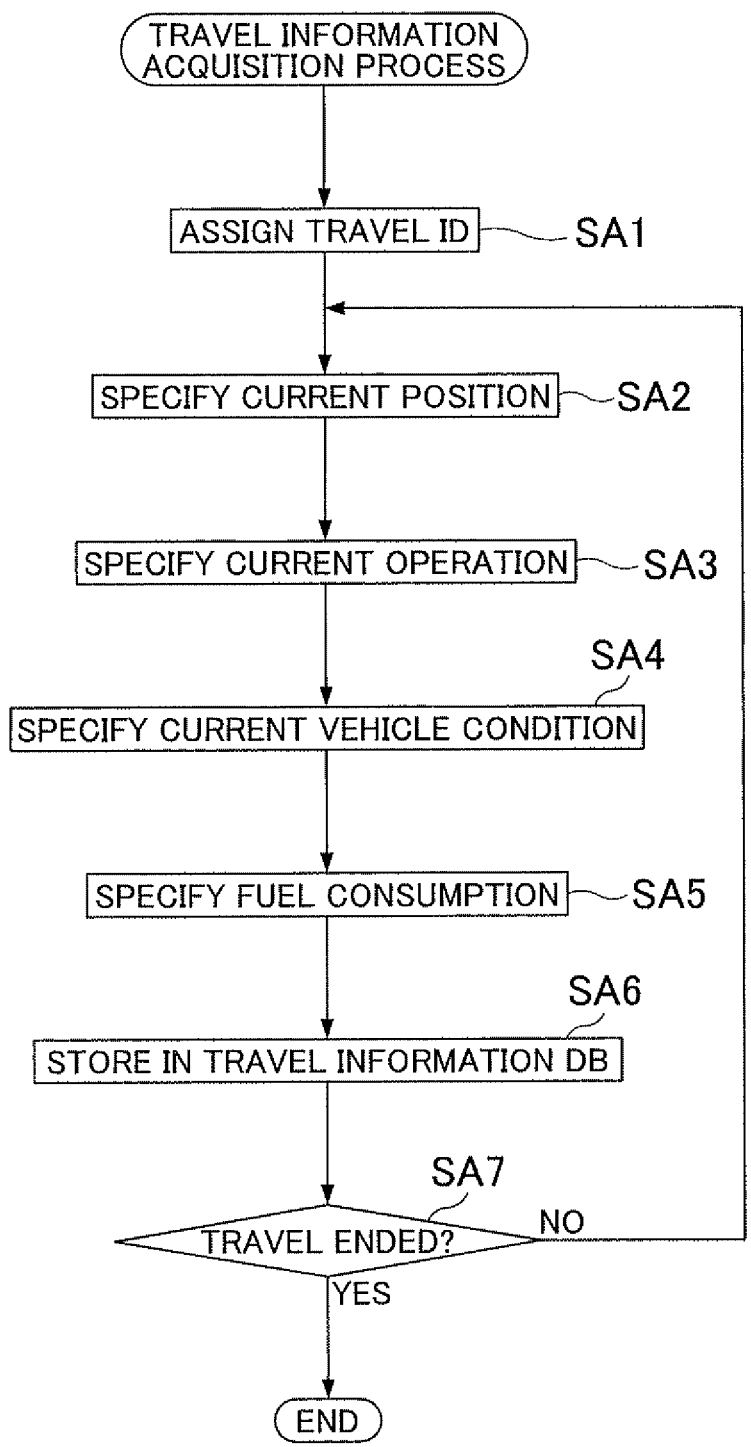
FIG. 3 is a flowchart of a travel information acquisition process.

The travel information acquisition process will be described first. FIG. 3 is a flowchart of the travel information acquisition process algorithm (steps in the descriptions of each process below are abbreviated to "S"). The travel information acquisition process is activated when the vehicle starts to travel. For example, the travel information acquisition process may be automatically activated when the engine is started, when the navigation device 50 is turned on, or when route guidance is started.

After activation of the travel information acquisition process, the control unit 51 assigns a travel ID for uniquely identifying a started sequence of travel of the vehicle (SA1). The control unit 51 next specifies the current position of the vehicle through the current position detection processing unit 20 (SA2). The control unit 51 also specifies a current operation of the vehicle (SA3). The specific content of the operation to be specified may take on any form; for example, the vehicle driving mode (HV or EV) is specified here through the ECU 10. The control unit 51 also specifies a current vehicle condition of the vehicle (SA4). The specific content of the vehicle condition to be specified may take on any form; in the present example, the SOC of the battery is specified through the ECU 10. However, a number of vehicle occupants may be specified as the vehicle condition in place of the SOC or together with the SOC. Further, an environmental condition such as the time, weather, atmospheric temperature, atmospheric pressure or the like may be specified in addition to a vehicle condition. Of these examples, the atmospheric temperature and atmospheric pressure can be specified through various types of sensors, and the weather can be specified based on weather information that is acquired through a communication unit (not shown in the drawings). The control unit 51 also specifies a fuel consumption from the start of vehicle travel until the present time (SA5). For example, an amount of remaining fuel may be specified through the ECU 10, and the fuel consumption calculated based on a difference between the specified amount of remaining fuel and the amount of remaining fuel at the start of vehicle travel. Note that, by executing the processes from SA2 to SA5 at substantially the same timing, the vehicle operation, vehicle condition, and fuel consumption can be acquired for a specific position among the sequence of travel.

Next, the control unit 51 mutually associates and stores position information that corresponds to the position specified at SA2, operation information that corresponds to the operation specified at SA3, vehicle condition information that corresponds to the vehicle condition specified at SA4, and fuel consumption information that corresponds to the fuel consumption specified at SA5 in the travel information DB 52b (SA6).

The control unit 51 then determines whether the sequence of travel of the vehicle has ended (SA7). When determining whether the sequence of travel has ended, the control unit 51 determines that the sequence of travel of the vehicle has ended if the engine is stopped, if the navigation device 50 is turned off, or if the vehicle reaches the destination point of the route guidance, for example.

Consequently, if it is determined that the sequence of travel of the vehicle has not ended (SA7: No), the control unit 51 returns to SA2 and repeatedly executes the processes from SA2 to SA7 until the vehicle ends the sequence of travel. Thus, information that specifies the vehicle operation, vehicle condition, and fuel consumption at each position the vehicle travels from the start of the sequence of travel until the end is mutually associated and serially stored in the travel information DB 52b.

However, if it is determined that the sequence of travel of the vehicle has ended (SA7: Yes), the control unit 51 ends the travel information acquisition process.

B. Display Control Process

Figure 4:
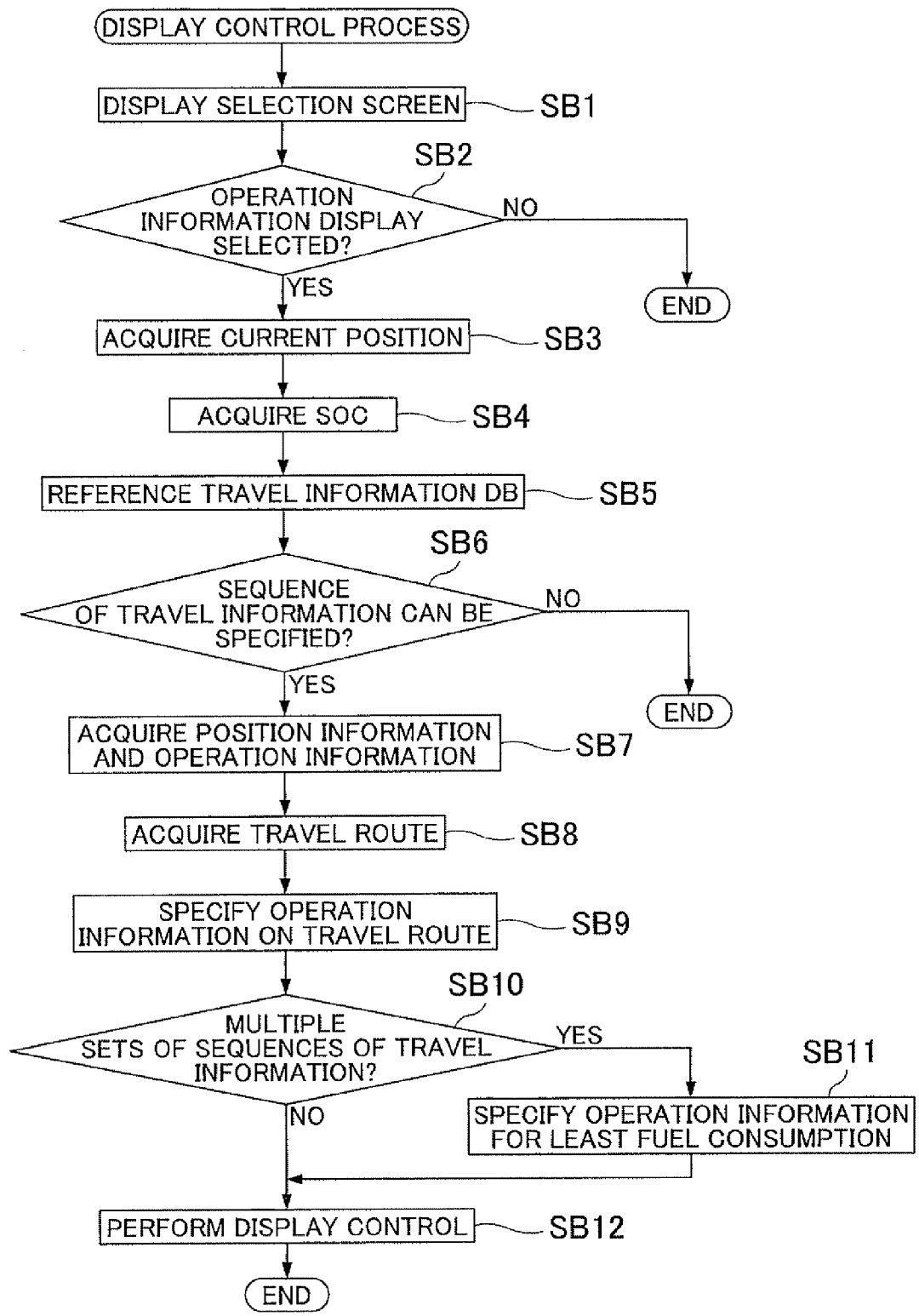
FIG. 4 is a flowchart of a display control process.

The display control process will be described next. FIG. 4 is a flowchart of the display control process algorithm. The display control process may be automatically activated after the navigation device 50 is turned on, for example. Note that, as an example, the display control process is described here using the SOC as the vehicle condition.

Figure 5:
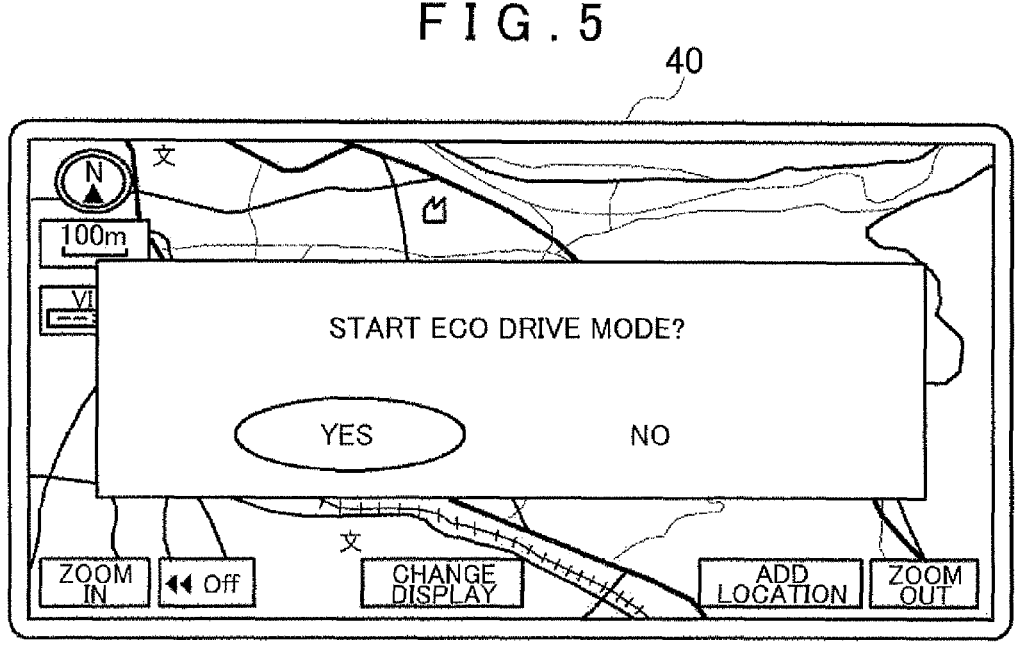
FIG. 5 is a drawing that illustrates a display showing a selection screen for whether to display operation information.

As shown in FIG. 4, after the display control process is activated, the display control unit 51c displays a selection screen for whether to display operation information in the route guidance on the display 40 (SB1). FIG. 5 is a drawing that illustrates the display 40 showing a selection screen for whether to display operation information. In the example of FIG. 5, a mode that displays the operation information is an "eco drive mode," and a selection screen for whether to start the eco drive mode is displayed on the display 40.

The display control unit 51c then determines whether a selection to display the operation information has been made based on the selection screen displayed on the display 40 at SB1 (SB2). Consequently, if a selection to display the operation information has not been made (SB2: No), the display of the operation information is considered unnecessary and the display control process is ended.

However, if a selection has been made to display the operation information (SB2: Yes), the reference position acquisition unit 51a acquires a reference position related to vehicle travel (SB3). Here, the "reference position" is a position that serves as a reference for the vehicle's travel. For example, the reference position may be a current position acquired through the current position detection processing unit 20, a home position acquired from the map information DB 52a, or a departure point in the route guidance. Note that in the following description, as an example, the current position is acquired as the reference position.

Next, the vehicle condition acquisition unit 51b acquires the battery SOC through the ECU 10 as a vehicle condition of the vehicle at the current position acquired at SB3 (SB4).

The display control unit 51c then refers to the travel information DB 52b (SB5), and determines whether it is possible to specify a sequence of travel information which includes position information corresponding to the current position acquired at SB3 and for which vehicle condition information associated with the position information corresponds to the SOC acquired at SB4 (SB6). Specifically, first, based on whether a position that is specified on the basis of position information stored in the travel information DB 52b is within a prescribed distance from the current position acquired at SB3, the display control unit 51c determines whether a sequence of travel information that includes the position information is a sequence of travel information that includes position information corresponding to the current position acquired at SB3. If the position specified on the basis of the position information stored in the travel information DB 52b is within a prescribed distance from the current position, the display control unit 51c determines that the sequence of travel information that includes the position information is a sequence of travel information that includes position information corresponding to the current position acquired at SB3. Next, if it is determined that the sequence of travel information that includes the position information is a sequence of travel information that includes position information corresponding to the current position acquired at SB3, the display control unit 51c determines whether the battery SOC, which serves as a vehicle condition specified on the basis of the vehicle condition information associated with the position information is within a prescribed range (e.g., within ±3%) from the SOC acquired at SB4. If the battery SOC specified on the basis of the vehicle condition information is within the prescribed range (e.g., within ±3%) from the SOC acquired at SB4, the display control unit 51c determines that it is possible to specify a sequence of travel information which includes position information corresponding to the current position acquired at SB3 and for which vehicle condition information associated with the position information corresponds to the SOC acquired at SB4.

Position information that specifies a position closest to the current position acquired at SB3 among the position information stored in the travel information DB 52b may be used as the position information corresponding to the current position, and vehicle condition information that specifies an SOC closest to the SOC acquired at SB4 may be used as the vehicle condition information corresponding to the SOC acquired at SB4. In such case, the determination result at SB6 will always be Yes.

Consequently, if it is determined that it is not possible to specify a sequence of travel information which includes position information corresponding to the current position acquired at SB3 and for which vehicle condition information associated with the position information corresponds to the SOC acquired at SB4 (SB6: No), the display control unit 51c determines it impossible to perform a display control that corresponds to the vehicle's SOC at the current position, and ends the display control process.

However, if it is determined that it is possible to specify a sequence of travel information which includes position information corresponding to the current position acquired at SB3 and for which vehicle condition information associated with the position information corresponds to the SOC acquired at SB4 (SB6: Yes), the display control unit 51c acquires from the travel information DB 52b the position information included in the sequence of travel information determined as specifiable and the operation information associated with the position information (SB7). In the example of FIG. 2, if the position information that corresponds to the current position acquired at SB3 is "36.5520, 135.3654" and the vehicle condition information that corresponds to the SOC acquired at SB4 is "70," the display control unit 51c acquires from the travel information DB 52b a sequence of position information ("36.5520, 135.3654," "36.5525, 135.3656," "36.5531, 135.3655," "36.5536, 135.3653," "36.5542, 135.3652," and so forth) and a sequence of operation information ("EV," "EV," "EV," "HV," "HV," and so forth) associated with the position information, which are included in the sequence of travel information (which correspond to the travel ID "001") that includes such position information and vehicle condition information.

If there is a plurality of sets of position information corresponding to the current position acquired at SB3 and vehicle condition information corresponding to the SOC acquired at SB4 stored in the travel information DB 52b, the position information and the operation information included in each sequence of travel information that includes each set are acquired from the travel information DB 52b. That is, in the example of FIG. 2, sequences of position information and operation information that correspond to each of a plurality of travel IDs are acquired from the travel information DB 52b.

Returning to FIG. 4, the travel route acquisition unit 51d acquires a travel route originating from the current position acquired at SB3 (SB8). Any method may be used for acquiring a travel route. For example, a travel route originating from the current position acquired at SB3 may be acquired from among the travel route set in the route guidance of the navigation device 50. Alternatively, a destination point and a travel route originating from the current position acquired at SB3 may be estimated based on a past travel history (e.g. a commuting route traveled everyday or the like).

Next, the display control unit specifies from among the sequence of position information acquired at SB7 a sequence of position information in which each position specified on the basis of the position information matches each position of the travel route acquired by the travel route acquisition unit 51d at SB8. The display control unit also specifies a sequence of travel information that includes the sequence of position information. In addition, the display control unit specifies a sequence of operation information included in the specified sequence of travel information from among the sequence of operation information acquired at SB7 (SB9). In the example of FIG. 2, among the sequence of position information associated with the travel ID that corresponds to a sequence of travel information that includes the position information corresponding to the current position acquired at SB3 and the vehicle condition information corresponding to the SOC acquired at SB4, position information that matches the travel route acquired at SB8 is specified, a sequence of travel information that includes the position information is specified, and a sequence of operation information that is included in the sequence of travel information is specified.

Returning to FIG. 4, the display control unit 51c determines whether there are multiple sets of sequences of travel information specified at SB9 (SB10). Consequently, if there are multiple sets of sequences of travel information that include a sequence of travel information that matches each position of the travel route (SB10: Yes), the display control unit 51c specifies operation information in a sequence of travel with the least fuel consumption from among the operation information specified at SB9, based on the fuel consumption information stored associated with the operation information specified at SB9 (SB11). In the example of FIG. 2, among the operation information specified at SB9, the fuel consumption in the sequence of travel is specified by finding the difference between the fuel consumption stored associated with the corresponding operation information at the reference position and the end point of the sequence of travel. Then, based on a comparison of the specified fuel consumption among the multiple sequences of travel, the sequence of travel with the least fuel consumption is specified and the operation information in the sequence of travel is specified. Note that if the reference position matches the start point of the sequence of travel, the fuel consumption in the sequence of travel can be specified by simply acquiring the fuel consumption at the end point of the sequence of travel.

Figure 6:
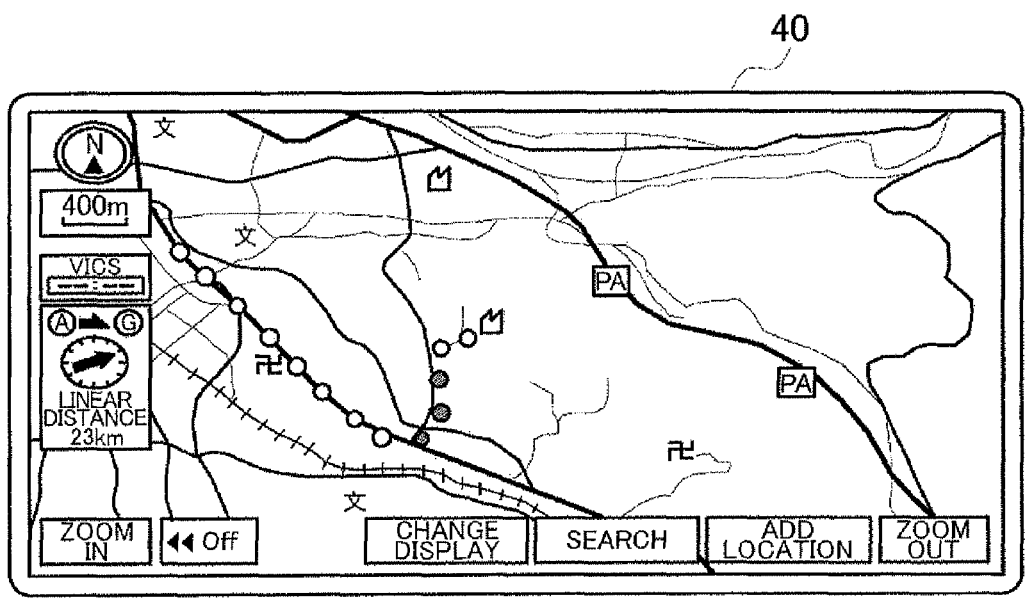
FIG. 6 is a drawing that illustrates a display showing operation information.
Figure 7:
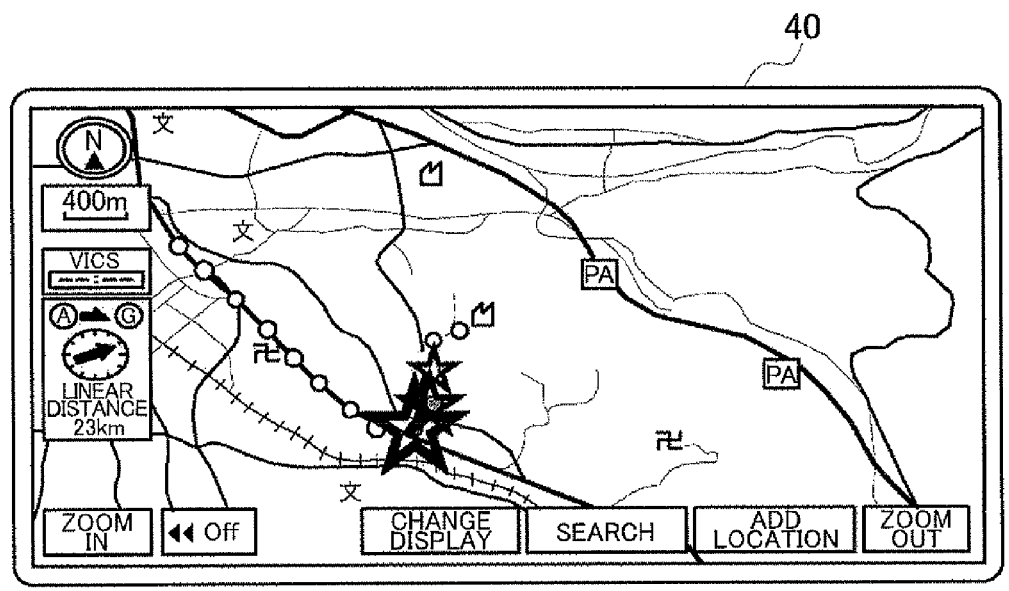
FIG. 7 is a drawing that illustrates a display showing operation information.

Returning to FIG. 4, if it is determined at SB10 that there are not multiple sets of sequences of travel information that include the sequence of position information that matches each position of the travel route (SB10: No), or after the processing at SB11 is performed, the display control unit 51c performs a display control for the specified operation information (SB12). FIGS. 6 and 7 are drawings that illustrate the display 40 showing operation information.

For example, the display control unit 51c superimposes the operation information specified at SB9 or SB11 on a map at positions specified on the basis of the position information that corresponds to the operation information. In other words, as shown in FIG. 6, markers that are color-coded depending on the driving mode specified on the basis of the operation information (in FIG. 6, the marker is white when the driving mode is EV, and hatched when the driving mode is HV) are displayed at positions specified on the basis of the position information that corresponds to the operation information so as to form a travel path. Accordingly, displaying the driving mode at each position on the travel route with the least fuel consumption can serve as an indicator when the driver is driving in a manner that suppresses fuel consumption.

Alternatively, while the vehicle is traveling on the travel route, the actual operation of the vehicle and the operation specified on the basis of the operation information displayed on the display 40 may be compared at each position on the travel route (for example, the actual driving mode of the vehicle may be EV while the driving mode that corresponds to the operation information displayed on the display 40 may be HV). If the actual operation of the vehicle is the operation with less fuel consumption, a display that indicates this may be output to the display 40. For example, as shown in FIG. 7, an animation in which stars appear at points where the actual operation of the vehicle is the operation with less fuel consumption may be displayed.

III. Effects

According to the example described above, a sequence of travel is specified which corresponds to the reference position acquired by the reference position acquisition unit 51a and the vehicle condition acquired by the vehicle condition acquisition unit 51b. Operation information that corresponds to the specified sequence of travel is acquired from the travel information DB 52b, and a display control for the acquired operation information is performed. Therefore, it is possible to provide guidance that incorporates the actual vehicle condition at the start of travel from a reference position such as the current position or the departure point, and the driver can be shown an indicator of the vehicle's operation.

In particular, a sequence of travel is specified that corresponds to the reference position acquired by the reference position acquisition unit 51a and the vehicle condition acquired by the vehicle condition acquisition unit 51b, wherein positions that correspond to the sequence of travel match a travel route originating from the reference position. Therefore, it is possible to show the driver an indicator of the vehicle's operation on a travel route to be followed by the vehicle while considering the actual vehicle condition at the start of travel from a reference position such as the current position or the departure point.

Further, operation information is specified for the sequence of travel with the least fuel consumption from the reference position to an end point of the travel route, and a display control for the specified operation information is performed. Therefore, it is possible to show the driver an indicator of the vehicle's operation for suppressing fuel consumption when following the travel route while considering the actual vehicle condition at the start of travel from a reference position such as the current position or the departure point.

The problems to be solved and the effects of the inventive principles described herein are not limited to the above examples and may vary depending on the environment in to which the principles are applied and the detailed configuration of their implementation. The above problems may be only partially solved, and the above effects only partially achieved.

VI. Modifications

While various features have been described in conjunction with the examples outlined above, various alternatives, modifications, variations, and/or improvements of those features and/or examples may be possible. Accordingly, the examples, as set forth above, are intended to be illustrative. Various changes, some examples of which are set forth below, may be made without departing from the broad spirit and scope of the underlying principles.

A. Travel Information Database

In the above example, the data storage unit 52 of the navigation device 50 was described as including the travel information DB 52b. However, an infatuation center that is communicably connected to a navigation device 50 in each vehicle may include a travel information DB 52b for each vehicle model. In such case, the travel information DB 52b may store the position information, the operation information, the vehicle condition information, and the fuel consumption information that are acquired from the navigation devices 50 of a plurality of vehicles communicably connected to the information center. Thus, in the display control process, a sequence of travel with the least fuel consumption may be specified from sequences of travel for a plurality of vehicles of the same model, and a display control performed for operation information in the specified sequence of travel.

Figure 8:
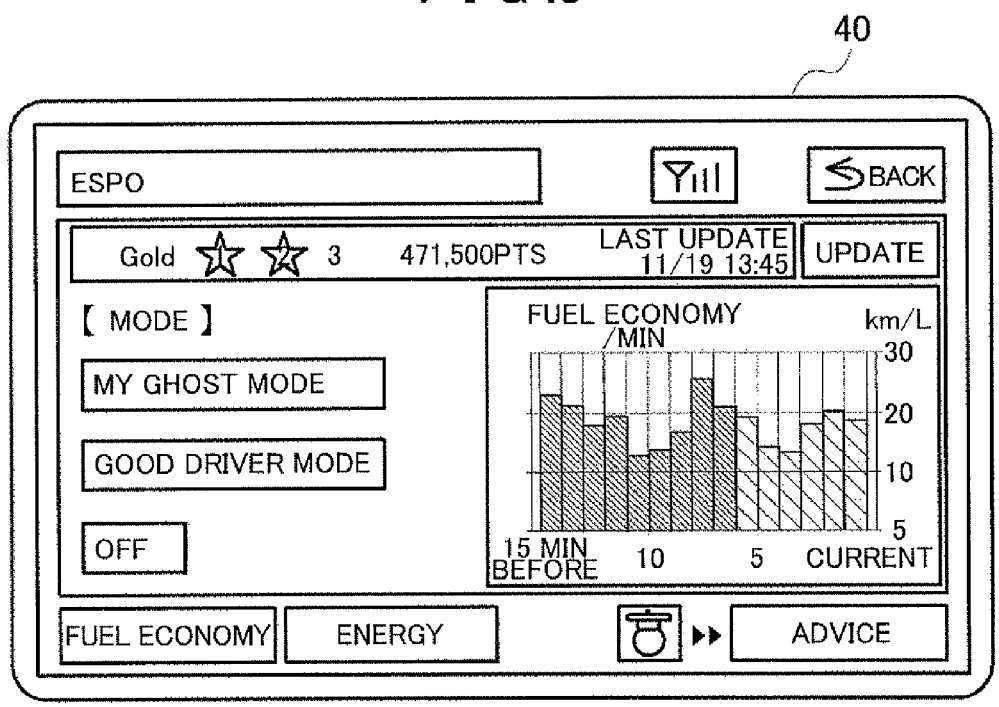
FIG. 8 is a drawing that illustrates a selection screen of operation information for which to perform a display control.

In such case, the user may select to display only the operation information of the host vehicle stored in the travel information DB 52b of the host vehicle, or to display the operation information of one of a plurality of vehicles of the same model stored in the travel information DB 52b of the information center, and a display control may be performed for the selected operation information. FIG. 8 is a drawing that illustrates a selection screen of operation information for which to perform a display control. In the example of FIG. 8, the user selects one of two modes, "My ghost mode" and "Good driver mode." If "My ghost mode" is selected, as explained in the above example, based on a sequence of travel information stored in the travel information DB 52b, which is provided in the data storage unit 52 of the navigation device 50 of the host vehicle, a display control is performed for the operation information of the host vehicle in a sequence of travel with the least fuel consumption from the reference position to the end point of the travel route. However, if "Good driver mode" is selected, a sequence of travel with the least fuel consumption may be specified from sequences of travel for a plurality of vehicles of the same model that are stored in the travel information DB 52b provided in the information center, and a display control performed for operation information in the specified sequence of travel.

B. Operation Information

In the above example, as an example, the operation information is information that specifies a driving mode. However, other information may be used as the operation information. For example, an indicator that represents an operation amount of an accelerator, a brake, or the like may be used as the operation information.

More specifically, an eco level that is determined depending on an engine speed or a throttle opening, for example, may be used as the operation information. In such case, at SB11 of the display control process shown in FIG. 4, markers that are color-coded depending on the eco level are displayed at positions specified on the basis of the position information that corresponds to the operation information so as to form a travel path. Accordingly, displaying the eco level at each position on the travel route with the least fuel consumption can serve as an indicator when the driver is driving in a manner that suppresses fuel consumption.

Alternatively, the lit status of an eco lamp that turns on when the throttle opening is equal to or less than a prescribed degree may be used as the operation information. In such case, at SB11 of the display control process shown in FIG. 4, markers that are color-coded depending on the on/off state of the eco lamp are displayed at positions specified on the basis of the position information that corresponds to the operation information so as to form a travel path.

As another alternative, if it is determined that the accelerator pedal has been excessively depressed when the throttle opening is equal to or greater than a prescribed degree, whether the accelerator pedal has been excessively depressed may be used as the operation information. In such case, at SB11 of the display control process shown in FIG. 4, markers that are color-coded depending on excessive depression of the accelerator pedal are displayed at positions specified on the basis of the position information that corresponds to the operation information so as to form a travel path.

C. Display Control Process

In the above example, at SB12 of the display control process shown in FIG. 4, the specified operation information is superimposed on a map at positions specified on the basis of the position information that corresponds to the operation information. However, another display control may be performed.

Figure 9A:
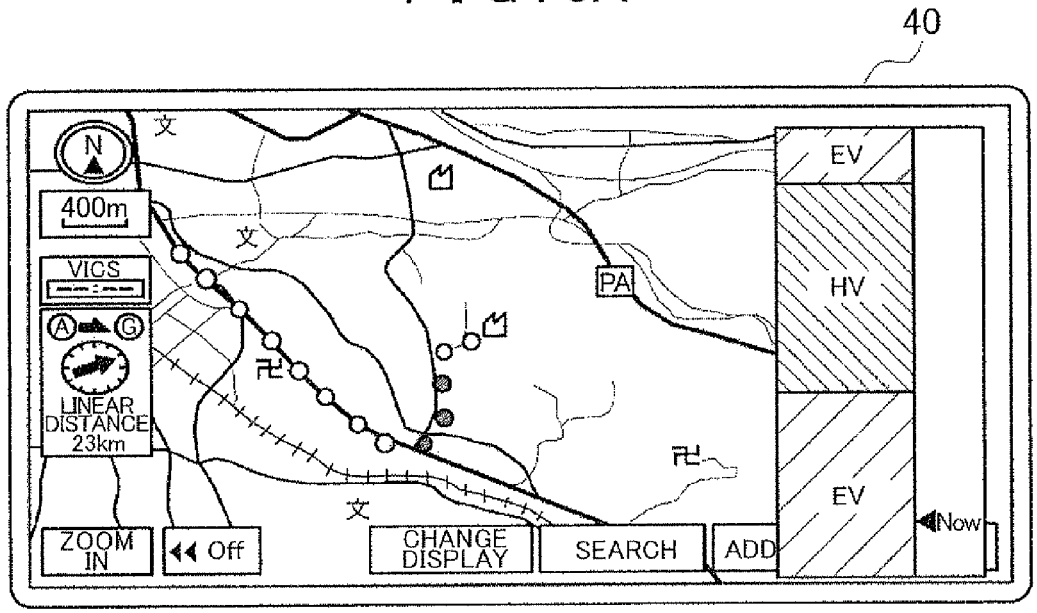
FIGS. 9A and 9B are drawings that illustrate examples of other dedicated screens for operation information in a map display shown on the display.
Figure 9B:
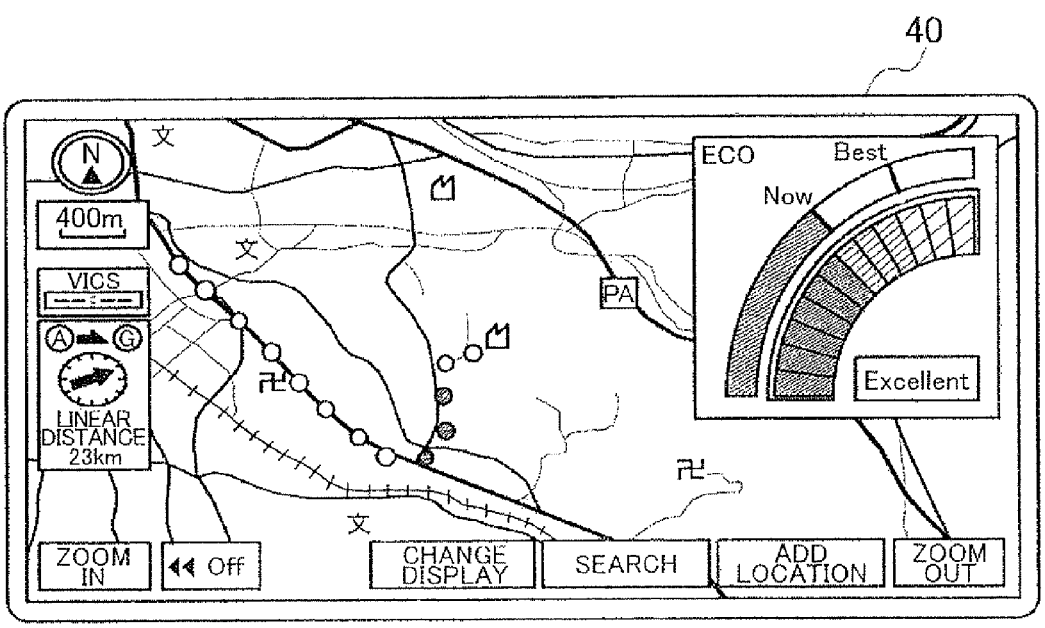

FIGS. 9A and 9B are drawings that illustrate examples of other dedicated screens for operation information in a map display shown on the display 40. For example, as shown in FIG. 9A, operation information on a travel route from the reference position to the destination point may be displayed in a linear bar graph format. In such case, the distance from a reference value to each position on the travel route is displayed so as to be proportional to the length from the origin of the bar graph (the bottom of the bar graph in FIG. 9A) to portions on the bar graph that correspond to each position on the travel route. Thus, the driver can be shown operation information serving as an indicator of future driving operations in an instinctively easy-to-understand format. Further, in cases where the entire travel path cannot be displayed on the screen of the display 40 (for example, when the map scrolls during travel, or when the map display becomes more detailed due to a change in scale), a bar graph such as that shown in FIG. 9A may be displayed. Thus, operation information serving as an indicator of a driving operation can be shown to the driver in format that enables easy understanding of the operation information for the entire travel route.

Alternatively, when the eco level is used as operation information, as shown in FIG. 9B, an eco level that corresponds to the current position among eco levels specified at SB10 in FIG. 4, and a current actual eco level (a portion shown as "Now" in FIG. 9B) may be displayed on a level meter that compares the two against each other. Thus, it is possible to display a more detailed indicator when the driver is driving in a manner that suppresses fuel consumption.

In addition, after vehicle travel is ended, the fuel consumption for a sequence of travel that corresponds to the operation information for which the display control unit 51c performed a display control may be displayed on the display 40, together with the actual fuel consumption of the vehicle.

In the display control process according to the above example, as an example, the current position was used as the reference position. However, a home position set in advance, a departure point in the route guidance, or the like may also be used as the reference position. In such case, the vehicle condition at the reference position may be specified based on information input by the user through a commonly known operation mechanism, for example.

In the display control process according to the above example, position information that is included in a sequence of travel, which includes position information corresponding to the reference position and for which vehicle condition information associated with the position information corresponds to the vehicle condition acquired at SB4; and operation information associated with the position information are acquired. However, the position information and the operation information may be further acquired based on an environmental condition such as the time, weather, atmospheric temperature, atmospheric pressure, or the like.

What is claimed is:

1. A navigation device for a host vehicle that communicates with a travel information storage unit that stores travel sequences, stored data for each past travel sequence including: at least one position along the travel sequence, operation information that specifies a vehicle operation at each stored position, and vehicle condition information that specifies a vehicle condition at each stored position, the vehicle condition being at least one of a state of charge of a vehicle battery and a number of occupants, the navigation device comprising:
    a controller that:
        acquires a reference position related to a traveling of the host vehicle;
        acquires a vehicle condition of the host vehicle at the reference position, the vehicle condition being at least one of a state of charge of a battery of the host vehicle and a number of occupants of the host vehicle;
        identifies a stored sequence of travel having a stored position that corresponds to the acquired reference position of the host vehicle and having stored vehicle condition information that corresponds to the acquired vehicle condition of the host vehicle;
        acquires the stored operation information of the identified stored sequence of travel;
        generates display information based on the acquired operation information; and
        causes the generated display information to be displayed on a display.

2. The navigation device according to claim 1, wherein the controller:
    acquires a travel route for the host vehicle originating from the reference position; and
    identifies the stored sequence of travel by identifying a sequence of travel having the stored vehicle condition information that corresponds to the acquired vehicle condition of the host vehicle and having stored positions that correspond to the acquired travel route.

3. The navigation device according to claim 2, wherein:
    the stored data for each travel sequence includes fuel consumption information that is associated with each stored position; and
    the controller identifies the stored sequence of travel by identifying a sequence of travel having the least fuel consumption from the reference position to an end point of the acquired travel route.

4. The navigation device according to claim 1, wherein:
    the vehicle condition information is the state of charge of the vehicle battery; and
    the stored vehicle condition information corresponds to the acquired vehicle condition of the host vehicle when the state of charge of the vehicle battery is within a predetermined amount of a state of charge of the battery of the host vehicle.

5. The navigation device according to claim 4, wherein the state of charge of the vehicle battery is within the predetermined amount of the state of charge of the battery of the host vehicle when the state of charge of the vehicle battery is within 3% of the state of charge of the battery of the host vehicle.

6. The navigation device according to claim 1, wherein the specified vehicle operation includes either hybrid driving mode or electric driving mode.

7. The navigation device according to claim 1, wherein the specified vehicle operation includes at least one of:
- an operation amount of an accelerator;
- an operation amount of a brake;
- an eco level that represents an engine speed or a throttle opening;
- a status of an eco lamp.

8. The navigation device according to claim 1, further comprising the travel information storage unit, wherein the stored travel sequences are based on prior travel by the host vehicle.

9. The navigation device according to claim 1, wherein:
- the information storage unit is located in a remote information center; and
- the stored travel sequences are based on prior travel by a plurality of vehicles.

10. A navigation method for a host vehicle, the method comprising:
- acquiring a reference position related to a traveling of the host vehicle;
- acquiring a vehicle condition of the host vehicle at the reference position, the vehicle condition being at least one of a state of charge of a battery of the host vehicle and a number of occupants of the host vehicle;
- accessing a travel information storage unit that stores past travel sequences, stored data for each travel sequence including: at least one position along the travel sequence, operation information that specifies a vehicle operation at each stored position, and vehicle condition information that specifies a vehicle condition at each stored position, the vehicle condition being at least one of a state of charge of a vehicle battery and a number of occupants;
- identifying a stored sequence of travel having a stored position that corresponds to the acquired reference position of the host vehicle and having stored vehicle condition information that corresponds to the acquired vehicle condition of the host vehicle;
- acquiring the stored operation information of the identified stored sequence of travel;
- generating display information based on the acquired operation information; and
- causing the generated display information to be displayed on a display.

11. The navigation method according to claim 10, further comprising:
- acquiring a travel route for the host vehicle originating from the reference position; and
- identifying the stored sequence of travel by identifying a sequence of travel having the stored vehicle condition information that corresponds to the acquired vehicle condition of the host vehicle and having stored positions that correspond to the acquired travel route.

12. The navigation method according to claim 11, wherein:
- the stored data for each travel sequence includes fuel consumption information that is associated with each stored position; and
- the method further comprises identifying the stored sequence of travel by identifying a sequence of travel having the least fuel consumption from the reference position to an end point of the acquired travel route.

13. The navigation method according to claim 10, wherein:
- the vehicle condition information is the state of charge of the vehicle battery; and
- the stored vehicle condition information corresponds to the acquired vehicle condition of the host vehicle when the state of charge of the vehicle battery is within a predetermined amount of a state of charge of the battery of the host vehicle.

14. The navigation method according to claim 13, wherein the state of charge of the vehicle battery is within the predetermined amount of the state of charge of the battery of the host vehicle when the state of charge of the vehicle battery is within 3% of the state of charge of the battery of the host vehicle.

15. The navigation method according to claim 10, wherein the specified vehicle operation includes at least one of:
- either hybrid driving mode or electric driving mode;
- an operation amount of an accelerator;
- an operation amount of a brake;
- an eco level that represents an engine speed or a throttle opening;
- a status of an eco lamp.

16. The navigation method according to claim 10, wherein the stored travel sequences are based on prior travel by the host vehicle.

17. The navigation method according to claim 10, wherein:
- the information storage unit is located in a remote information center; and
- the stored travel sequences are based on prior travel by a plurality of vehicles.

18. A non-transitory computer-readable medium storing a computer-executable program, the program comprising:
- instructions for acquiring a reference position related to a traveling of a host vehicle;
- instructions for acquiring a vehicle condition of the host vehicle at the reference position, the vehicle condition being at least one of a state of charge of a battery of the host vehicle and a number of occupants of the host vehicle;
- instructions for accessing a travel information storage unit that stores past travel sequences, stored data for each travel sequence including: at least one position along the travel sequence, operation information that specifies a vehicle operation at each stored position, and vehicle condition information that specifies a vehicle condition at each stored position, the vehicle condition being at least one of a state of charge of a vehicle battery and a number of occupants;
- instructions for identifying a stored sequence of travel having a stored position that corresponds to the acquired reference position of the host vehicle and having stored vehicle condition information that corresponds to the acquired vehicle condition of the host vehicle;
- instructions for acquiring the stored operation information of the identified stored sequence of travel;
- instructions for generating display information based on the acquired operation information; and
- instructions for causing the generated display information to be displayed on a display.

* * * * *